(12) United States Patent
Wu

(10) Patent No.: US 10,663,140 B1
(45) Date of Patent: May 26, 2020

(54) OPTICAL LENS AND LIGHT SOURCE MODULE

(71) Applicants: LITE-ON ELECTRONICS (GUANGZHOU) LIMITED, Guangzhou (CN); Lite-On Technology Corporation, Taipei (TW)

(72) Inventor: Bing-Yu Wu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/390,006

(22) Filed: Apr. 22, 2019

(30) Foreign Application Priority Data

Dec. 12, 2018 (CN) .......................... 2018 1 1516975

(51) Int. Cl.
*F21V 5/00* (2018.01)
*F21V 5/04* (2006.01)
*G02B 27/09* (2006.01)
*F21V 7/00* (2006.01)
*F21Y 115/10* (2016.01)

(52) U.S. Cl.
CPC ................ *F21V 5/04* (2013.01); *F21V 5/007* (2013.01); *F21V 7/0091* (2013.01); *G02B 27/0916* (2013.01); *G02B 27/0955* (2013.01); *F21Y 2115/10* (2016.08)

(58) Field of Classification Search
CPC ............................... F21V 5/007; G02B 6/0016
See application file for complete search history.

(56) References Cited

U.S. PATENT DOCUMENTS

2018/0149336 A1* 5/2018 Tsai ...................... F21S 41/151

* cited by examiner

*Primary Examiner* — Joseph L Williams
*Assistant Examiner* — Jacob R Stern
(74) *Attorney, Agent, or Firm* — JCIPRNET

(57) ABSTRACT

An optical lens and a light source module are provided. The optical lens includes a light incident portion and a light guiding portion. The light incident portion includes two back optical surfaces, a first light incident surface, and two second light incident surfaces. The light guiding portion has a plurality of light guiding branches and the light guiding branches extend along different extending directions, wherein each of the light guiding branches has a main light emitting surface, and the first light incident surface and the second light incident surface face the main light emitting surfaces of the light guiding branches, respectively.

15 Claims, 6 Drawing Sheets

OPTICAL LENS AND LIGHT SOURCE MODULE

CROSS-REFERENCE TO RELATED APPLICATION

This application claims the priority benefit of China application serial no. 201811516975.4, filed on Dec. 12, 2018. The entirety of the above-mentioned patent application is hereby incorporated by reference herein and made a part of this specification.

BACKGROUND

Technical Field

The invention relates to an optical lens and a light source module, and particularly relates to an optical lens and a light source module having a plurality of light emitting points.

Description of Related Art

In recent years, along with improvement of light emitting efficiency and a service life of light emitting diodes (LED), as well as device characteristics and advantages of low energy consumption, low pollution, high efficiency, high reaction speed, small size, light weight and being adapted to be set on various surfaces, LEDs have been actively applied in various optical fields. Taking an application of the LED in illumination as an example, many applications of applying LED package structures to light sources (such as light bulbs, street lamps, flashlights, etc.) or related lighting devices have been developed.

However, since the LED a directional light source, the light is emitted only in a specific direction in form of a point light source, so that when the LED is applied to existing outdoor lighting equipment, such as street lamps or the like, it is easy to cause a glare in the light-emitting axial direction thereof due to concentration of light energy at a point. Moreover, since the light provided by the LED also has a limitation in energy distribution, in the case where the LED is applied to the existing outdoor lighting equipment, a design scheme is urgently needed to enable the light provided by the LED to be guided from a single light point into multiple surfaces, and to effectively distribute the light energy to a surface of an illuminated road in combination with an adjustable light shaping structure.

SUMMARY

The invention is directed to an optical lens, which is adapted to guide light to form a plurality of dispersed light spots.

The invention is directed to a light source module, which has a plurality of light spots, and is adapted to eliminate glare to implement a good light distribution.

The invention provides an optical lens including a light incident portion and a light guiding portion. The light incident portion includes two back optical surfaces, a first light incident surface, and two second light incident surfaces. Each of the two second light incident surfaces has a first side edge and a second side edge opposite to each other. The first light incident surface is connected to each of the second light incident surfaces through the first side edge of each of the second light incident surfaces. Each of the back optical surfaces is connected to each of the second light incident surfaces through the second side edge of each of the second light incident surfaces. The light guiding portion has a plurality of light guiding branches and the light guiding branches extend along different extending directions, wherein each of the light guiding branches has a main light emitting surface, and the first light incident surface and the second light incident surfaces face the main light emitting surfaces of the light guiding branches, respectively.

In an embodiment of the invention, the optical lens has a top surface, a bottom surface and a plurality of side surfaces, wherein the top surface is opposite to the bottom surface, and the top surface is connected to the bottom surface though the side surfaces, and the top surface has a plurality of top surface branches, the bottom surface has a plurality of bottom surface branches, the bottom surface branches respectively correspond to the top surface branches, and surfaces of one of the light guiding branches are formed by the corresponding top surface branch and the bottom surface branch and part of the side surfaces.

In an embodiment of the invention, contours of orthogonal projections of the top surface and the bottom surface on a reference plane are similar to each other, and an area of the contour of the orthogonal projection of the top surface on the reference plane is smaller than an area of the contour of the orthogonal projection of the bottom surface on the reference plane.

In an embodiment of the invention, the top surface and the bottom surface respectively have a T-shape contour.

In an embodiment of the invention, the side surface facing the first light incident surface or each of the second light incident surfaces is the main light emitting surface of each of the light guiding branches, and the main light emitting surface of each of the light guiding branches is a trapezoid.

In an embodiment of the invention, the bottom surface is connected with the back optical surfaces, the first light incident surface and the second light incident surfaces to form an accommodating space.

In an embodiment of the invention, the back optical surfaces are perpendicular to the bottom surface.

In an embodiment of the invention, the first light incident surface and the bottom surface have a first included angle there between, and the first included angle is between 90° and 160°.

In an embodiment of the invention, each of the side surfaces and the bottom surface have a second included angle there between, and the second included angle is between 20° and 90°.

The invention provides a light source module including at least one light emitting unit, and each of the light emitting units includes the aforementioned optical lens and a light emitting element. The light emitting element is adapted to provide a light beam, wherein the light beam enters the optical lens through the first light incident surface and the second light incident surfaces of the optical lens, and the light beam leaves the optical lens through the main light emitting surfaces of the light guiding branches.

In an embodiment of the invention, the number of the at least one light emitting unit is plural, and the light emitting units are arranged in interleaving to form an array.

According to the above description, the light source module of the invention is adapted to control an emitting axial direction and an emitting position of the emitted light through configuration of the light incident portion and the light guiding branches of the light guiding portion of the optical lens, so as to achieve a purpose of dispersing the emitted light. Moreover, the light source module may also control and adjust a light shape of the emitted light, such that the light provided by the LED may be guided and effectively distributed to external evenly, so as to eliminate the glare and achieve a good light distribution, which avails being applied to outdoor lighting equipment such as street lamps or the like.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
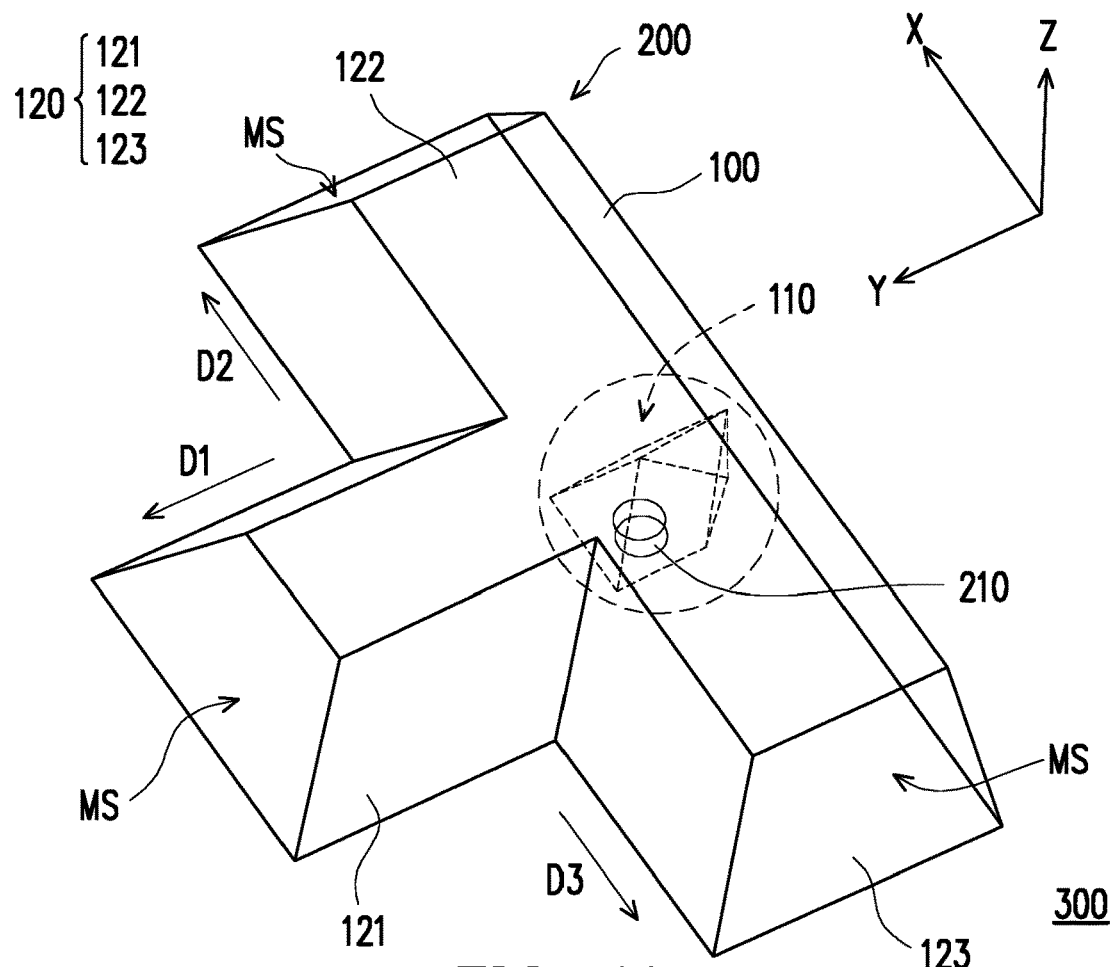
FIG. 1A is a three-dimensional view of a light source module according to an embodiment of the invention.
Figure 1B:
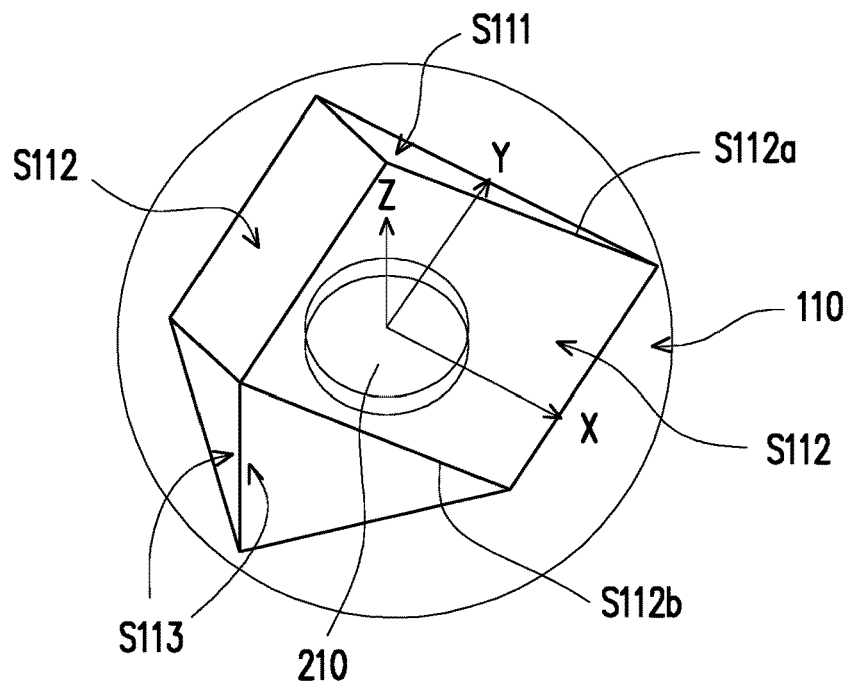
FIG. 1B is a structural schematic diagram of a light incident portion of the light source module of FIG. 1A.

FIG. 1A is a three-dimensional view of a light source module according to an embodiment of the invention. FIG. 1B is a structural schematic diagram of a light incident portion of the light source module of FIG. 1A. Referring to FIG. 1A and FIG. 1B, the light source module 300 includes at least one light emitting unit 200, and each of the light emitting unit 200 includes an optical lens 100 and a light emitting element 210. For example, in the embodiment, the light emitting element 210 may be a light emitting diode, and is adapted to provide a light beam.

To be specific, as shown in FIG. 1A and FIG. 1B, in the embodiment, the optical lens 100 includes a light incident portion 110 and a light guiding portion 120. The light incident portion 110 includes two back optical surfaces S113 used for implementing total reflection, a first light incident surface S111, and two second light incident surfaces S112. Each of the two second light incident surfaces S112 has a first side edge S112a and a second side edge S112b opposite to each other. The first light incident surface S111 is connected to each of the second light incident surfaces S112 through the first side edge S112a of each of the second light incident surfaces S112. Each of the back optical surfaces S113 is connected to each of the second light incident surfaces S112 through the second side edge S112b of each of the second light incident surfaces S112. As shown in FIG. 1A, in the embodiment, the light beam provided by the light emitting element 210 mainly enters the optical lens 100 through the first light incident surface S111 and the second light incident surfaces S112 of the optical lens 100, or a part of the light beam may also enter the optical lens 100 through the back optical surfaces S113.

On the other hand, as shown in FIG. 1A, in the embodiment, the light guiding portion 120 has a plurality of light guiding branches 121, 122 and 123, and the light guiding branches 121, 122 and 123 extend along different extending directions. For example, in the embodiment, the light guiding portion 120 includes a first light guiding branch 121, a second light guiding branch 122 and a third light guiding branch 123, where the first light guiding branch 121 extends along a first direction D1, the second light guiding branch 122 extends along a second direction D2, and the third light guiding branch 123 extends along a third direction D3. In the embodiment, the first direction D1 is, for example, parallel with a Y direction, and the second direction D2 and the third direction D3 are parallel with an X direction. In detail, in the embodiment, the first direction D1 is toward the +Y direction, the second direction D2 is toward the +X direction, and the third direction D3 is toward the −X direction. In other words, the first direction D1 is perpendicular to the second direction D2 or the third direction D3, and the second direction D2 is parallel with and opposite to the third direction D3, though the invention is not limited thereto.

Moreover, as shown in FIG. 1A, in the embodiment, each of the light guiding branches 121, 122 and 123 has a main light emitting surface MS, and the first light incident surface S111 and the second light incident surfaces S112 respectively face the main light emitting surfaces MS of the light guiding branches 121, 122 and 123. In this way, after the light beam provided by the light emitting element 210 enters the light guiding portion 120, the light beam is respectively transmitted in the light guiding branches 121, 122 and 123 along the first direction D1, the second direction D2 and the third direction D3. Therefore, the light beam provided by the light emitting element 210 may be propagated to the main light emitting surface MS of each of the light guiding branches 121, 122 and 123 to leave the optical lens 100, and a partial part of the light beam leaves the optical lens 100 through side surfaces SS.

In this way, the light source module 300 may control an emitting axial direction and an emitting position of the emitted light through configuration of the light incident portion 110 and the light guiding branches 121, 122 and 123 of the light guiding portion 120 of the optical lens 100, so as to achieve a purpose of dispersing the emitted light. Moreover, the light source module 300 may also control and adjust a light shape of the emitted light, such that the light provided by the LED as a point light source may be guided and effectively distributed evenly into a planar light source to the outside world, so as to eliminate the glare and achieve a good light distribution, which avails being applied to outdoor lighting equipment such as street lamps or the like. FIG. 2A to FIG. 4B are provided for further description.

Figure 2A:
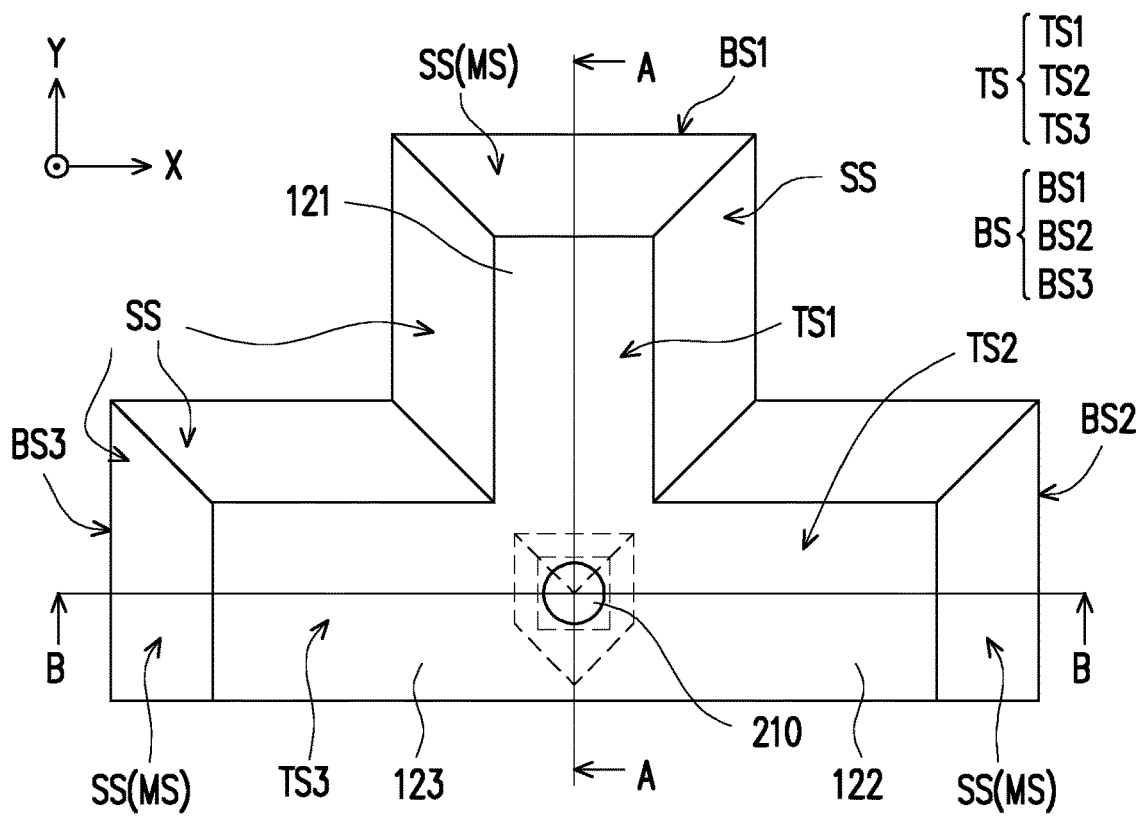
FIG. 2A is a top view of the light source module of FIG. 1A.
Figure 2B:
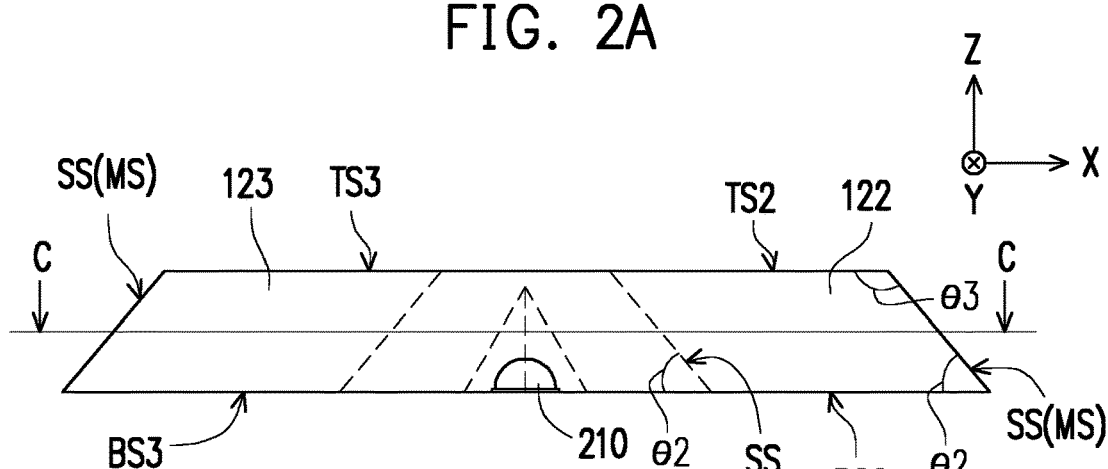
FIG. 2B is a front view of the light source module of FIG. 1A.
Figure 2C:
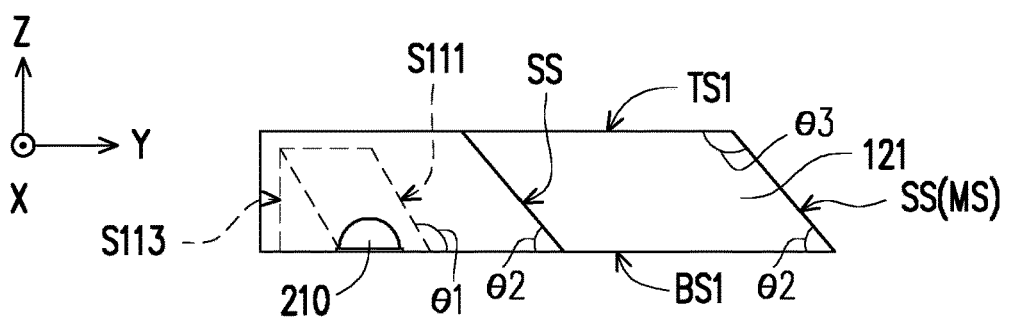
FIG. 2C is a side view of the light source module of FIG. 1A.
Figure 3A:
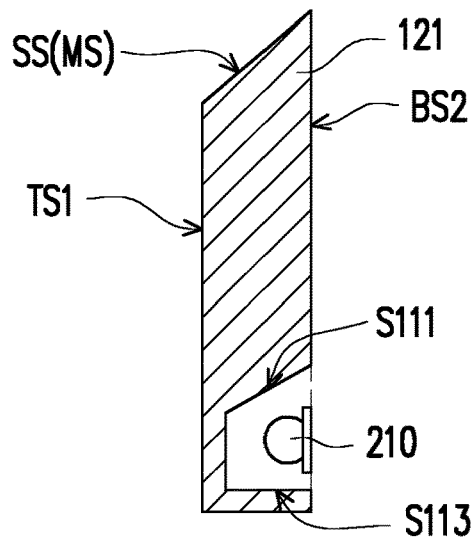
FIG. 3A is a cross-sectional view of the light source module of FIG. 2A along a line A-A.
Figure 3B:
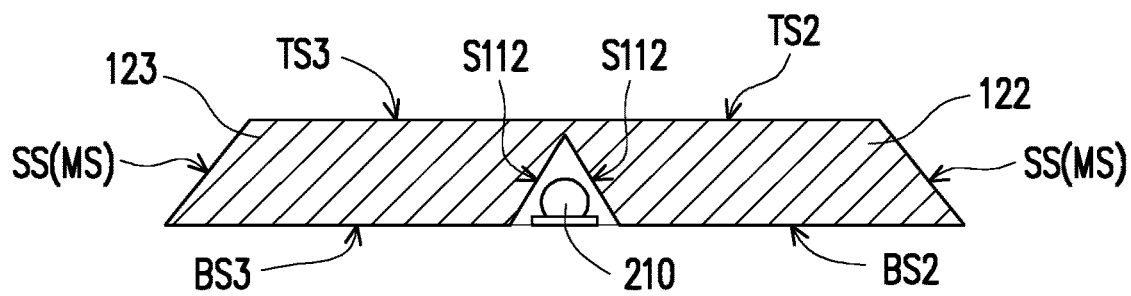
FIG. 3B is a cross-sectional view of the light source module of FIG. 2A along a line B-B.
Figure 3C:
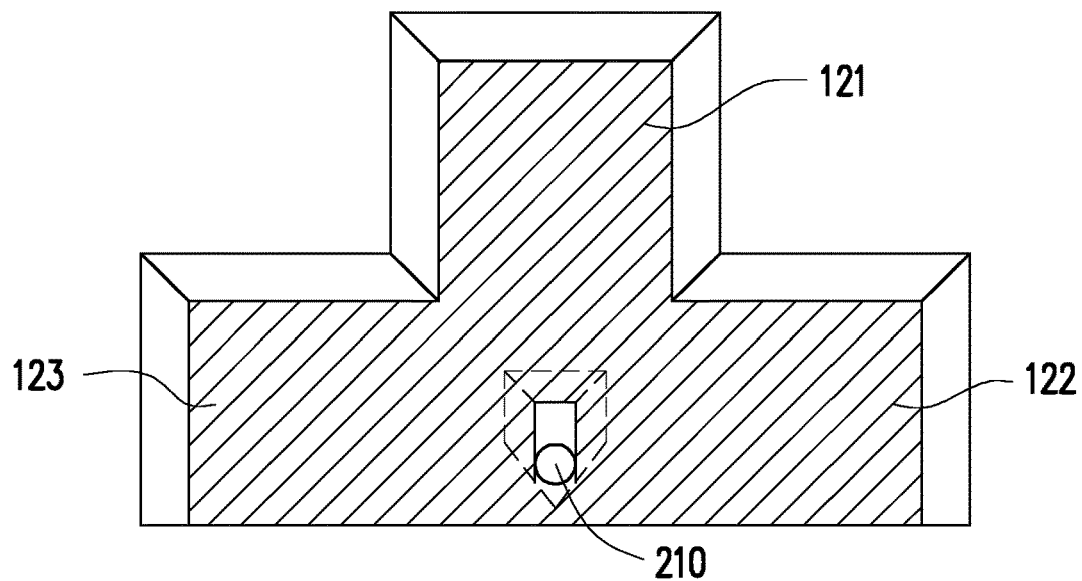
FIG. 3C is a cross-sectional view of a light guiding portion of the light source module of FIG. 2B along a line C-C.

FIG. 2A is a top view of the light source module of FIG. 1A. FIG. 2B is a front view of the light source module of FIG. 1A. FIG. 2C is a side view of the light source module of FIG. 1A. FIG. 3A is a cross-sectional view of the light source module of FIG. 2A along a line A-A. FIG. 3B is a cross-sectional view of the light source module of FIG. 2A along a line B-B. FIG. 3C is a cross-sectional view of the light guiding portion of the light source module of FIG. 2B along a line C-C. As shown in FIG. 2A to FIG. 3C, in the embodiment, the optical lens 100 has a top surface TS, a bottom surface BS and a plurality of side surfaces SS, where the top surface TS is opposite to the bottom surface BS, and the top surface TS is connected to the bottom surface BS through the side surfaces SS.

To be specific, as shown in FIG. 2A to FIG. 3C, in the embodiment, the bottom surface BS is connected with the back optical surfaces S113, the first light incident surface S111 and the second light incident surfaces S112 to form an accommodating space for accommodating the light emitting element 210. Moreover, for example, in the embodiment, as shown in FIG. 2C and FIG. 3A, the back optical surfaces S113 are perpendicular to the bottom surface BS. In this way, when the light beam provided by the light emitting element 210 penetrates through the back optical surface S113 and is refracted by the same, the light beam is reflected at a total reflection angle on the vertical plane at the back the optical lens 100. Therefore, based on the above angle design and configuration, the optical lens 100 may be able to control and reduce a proportion of the light beam provided by the light emitting element 210 that is emitted backwards (i.e., in the −Y direction).

On the other hand, as shown in FIG. 2A, the top surface TS of the optical lens 100 has a plurality of top surface branches TS1, TS2 and TS3, the bottom surface BS has a plurality of bottom surface branches BS1, BS2 and BS3, the bottom surface branches BS1, BS2 and BS3 respectively correspond to the top surface branches TS1, TS2 and TS3, and surfaces of the first light guiding branch 121 are formed by the corresponding top surface branch TS1 and the bottom surface branch BS1 and part of the side surfaces SS. Similarly, surfaces of the second light guiding branch 122 are also formed by the corresponding top surface branch TS2 and the bottom surface branch BS2 and part of the side surfaces SS, and surfaces of the third light guiding branch 123 are also formed by the corresponding top surface branch TS3 and the bottom surface branch BS3 and part of the side surfaces SS.

In detail, as shown in FIG. 2A, in the embodiment, contours of orthogonal projections of the top surface TS and the bottom surface BS on a reference plane are similar to each other. For example, in the embodiment, the reference plane is, for example, an XY plane, and the top surface TS and the bottom surface BS all have a T-shape contour. Moreover, as shown in FIG. 2A, in the embodiment, an area of the contour of the orthogonal projection of the top surface TS on the reference plane is smaller than an area of the contour of the orthogonal projection of the bottom surface BS on the reference plane. In other words, as shown in FIG. 2A to FIG. 2C, in the embodiment, a contour of each of the light guiding branches 121, 122 and 123 of the light guiding portion 120 is tapered toward a +Z direction.

On the other hand, as shown in FIG. 1A and FIG. 2A, in the embodiment, the side surface SS facing the first light incident surface S111 or each of the second light incident surfaces S112 is the main light emitting surface MS of each of the light guiding branches 121, 122 and 123. To be specific, as described above, in the embodiment, the light entering the optical lens 100 through the first light incident surface S111 or each of the second light incident surfaces S112 is emitted out from the main light emitting surfaces MS of the light guiding branches 121, 122 and 123. For example, as shown in FIG. 2A, in the embodiment, the main light emitting surface MS of each of the light guiding branches 121, 122 and 123 is a trapezoid. Moreover, in the embodiment, as shown in FIG. 2C and FIG. 3A, the first light incident surface S111 and the bottom surface BS have a first included angle θ1 there between, and the first included angle θ1 is between 90° and 160°. On the other hand, as shown in FIG. 2B and FIG. 2C, in the embodiment, each of the side surfaces SS and the bottom surface BS have a second included angle θ2 there between, and the second included angle θ2 is between 20° and 90°. Moreover, as shown in FIG. 2B and FIG. 2C, in the embodiment, each of the side surfaces SS and the corresponding top surface branches TS1, TS2 and TS3 respectively have a third included angle θ3 there between. In the embodiment, the third included angle θ3 is, for example, 130°, though the invention is not limited thereto, and in other embodiments, the third included angle θ3 may also be other angles between 90° and 175°.

Therefore, through the aforementioned configuration, the optical lens 100 may control and adjust an illumination angle of the light beam provided by the light emitting element 210 to the left and right (i.e., the ±X direction) and the front (i.e., the +Y direction), so as to control and adjust a light shape distribution of the light source module 300.

Figure 4A:
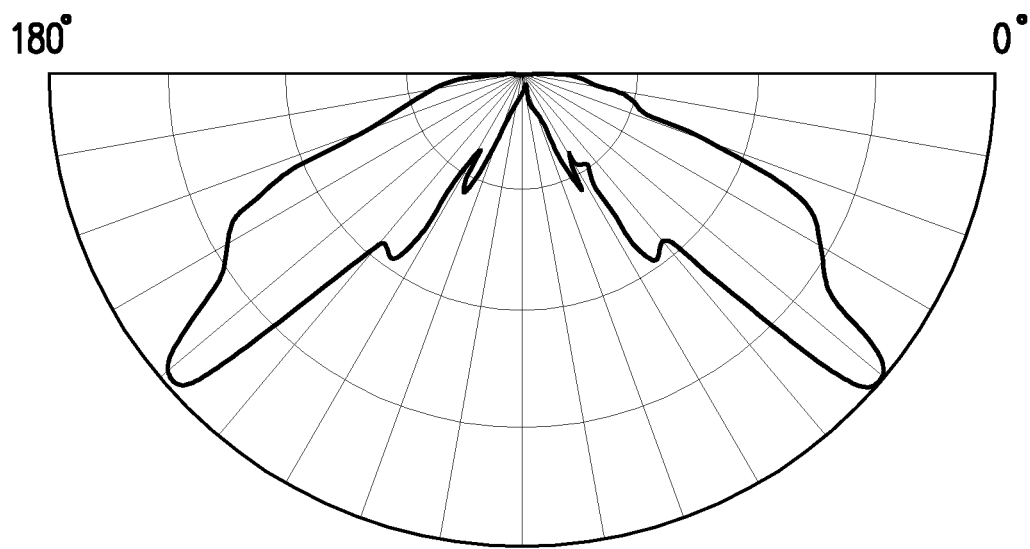
FIG. 4A is a light shape distribution diagram of the light source module of FIG. 1A in an X direction.
Figure 4B:
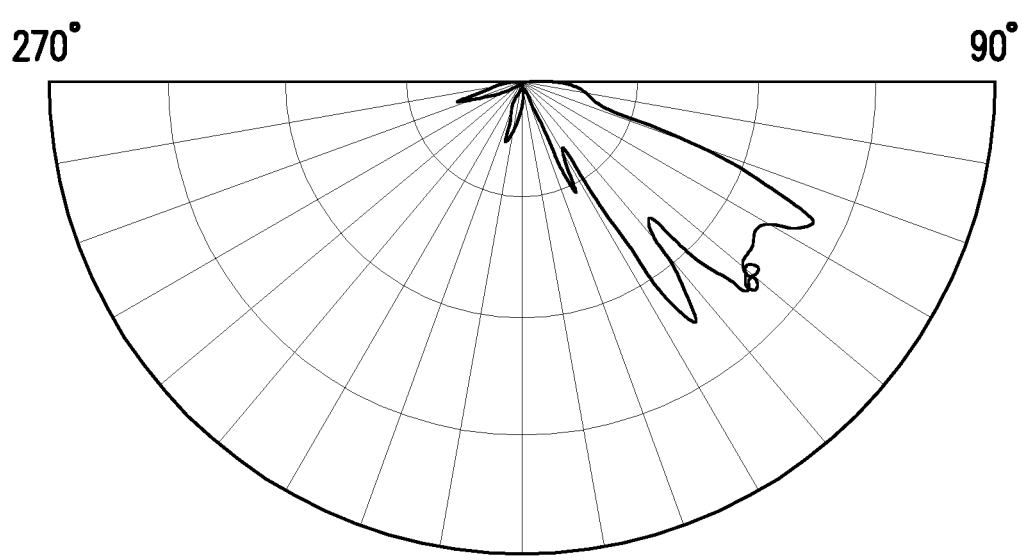
FIG. 4B is a light shape distribution diagram of the light source module of FIG. 1A in a Y direction.

FIG. 4A is a light shape distribution diagram of the light source module of FIG. 1A in the X direction, FIG. 4B is a light shape distribution diagram of the light source module of FIG. 1A in the Y direction, where a physical quantity represented by a radial direction of FIG. 3A and FIG. 4B is candlelight, while a circumferential direction is an angle of each azimuth on the XY plane, where the azimuth angle of the +X direction is 0°. As shown in FIG. 4A, in the embodiment, an angle range represented by the circumferential direction of FIG. 4A is 0° to 180°, so that the light shape distribution shown in FIG. 4A is a light shape distribution of the light source module 300 on the left and right sides (i.e., in the ±X direction). On the other hand, as shown in FIG. 4B, in the embodiment, an angle range represented by the circumferential direction of FIG. 4B is 90° to 270°, so that the light shape distribution shown in FIG. 4B is a light shape distribution of the light source module 300 on the front and rear sides (i.e., the ±Y direction). As shown in FIG. 4A and FIG. 4B, in the embodiment, according to the light shape distribution of the optical lens 100, a proportion of light emitted to the rear (i.e., the −Y direction) may be greatly reduced, and the emitted light is concentrated to the left and right (i.e., the ±X direction) and the front (i.e., the +Y direction). Moreover, as described above, through an angle design of the optical lens, the light source module 300 may also control and adjust the light shape distribution in the left and right (i.e., the ±X direction) and the front (i.e., the +Y direction), such that the illumination angle of the light source module 300 may meet the requirement.

In this way, the light source module 300 may control an emitting axial direction and an emitting position of the emitted light through configuration of the light incident portion 110 and the light guiding branches 121, 122 and 123 of the light guiding portion 120 of the optical lens 100, so as to achieve a purpose of dispersing the emitted light. Moreover, the light source module 300 may also control and adjust a light shape of the emitted light, such that the light provided by the LED may be guided and effectively and evenly distributed to external, so as to eliminate the glare and achieve a good light distribution, which avails being applied to outdoor lighting equipment such as street lamps or the like.

Figure 5A:
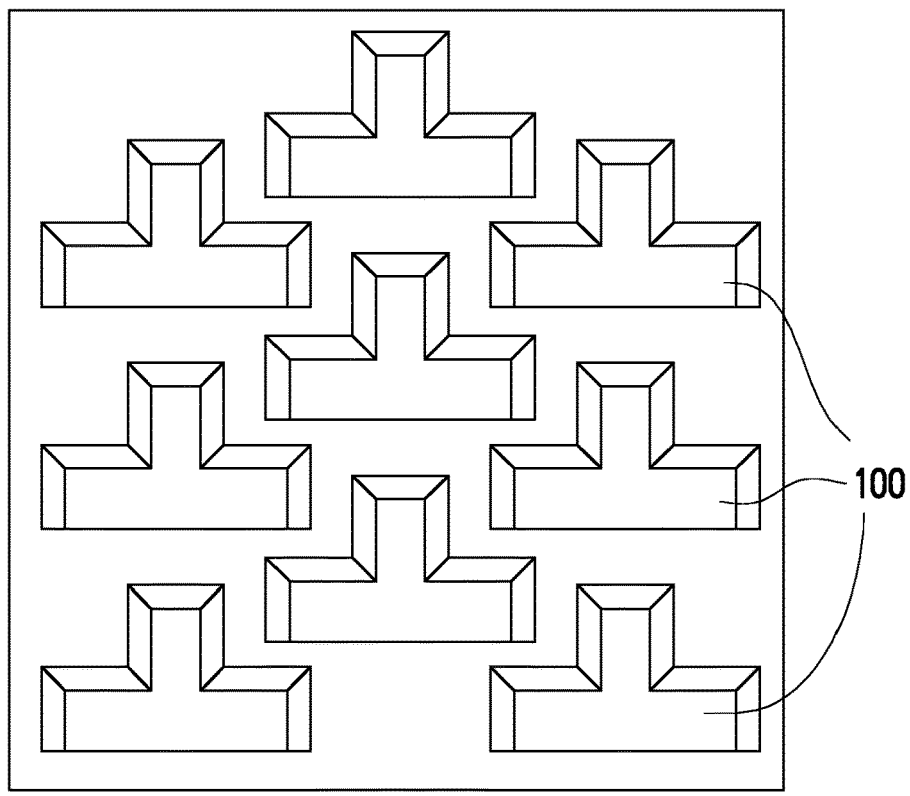
FIG. 5A to FIG. 5C are structural schematic diagrams of another light source module according to an embodiment of the invention.
Figure 5B:
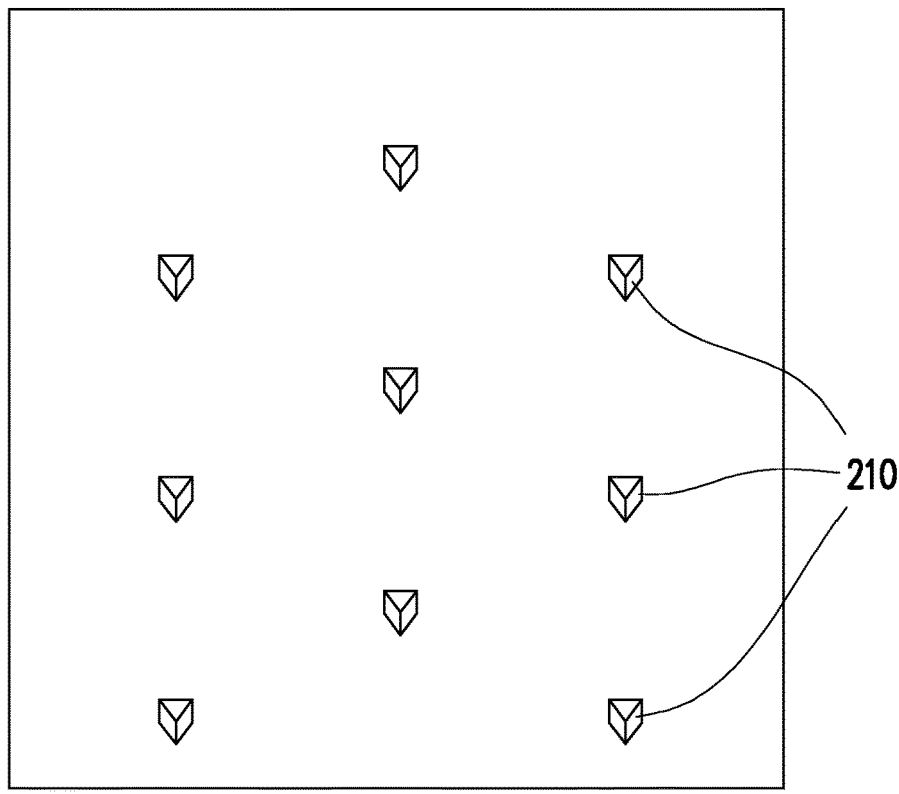
Figure 5C:
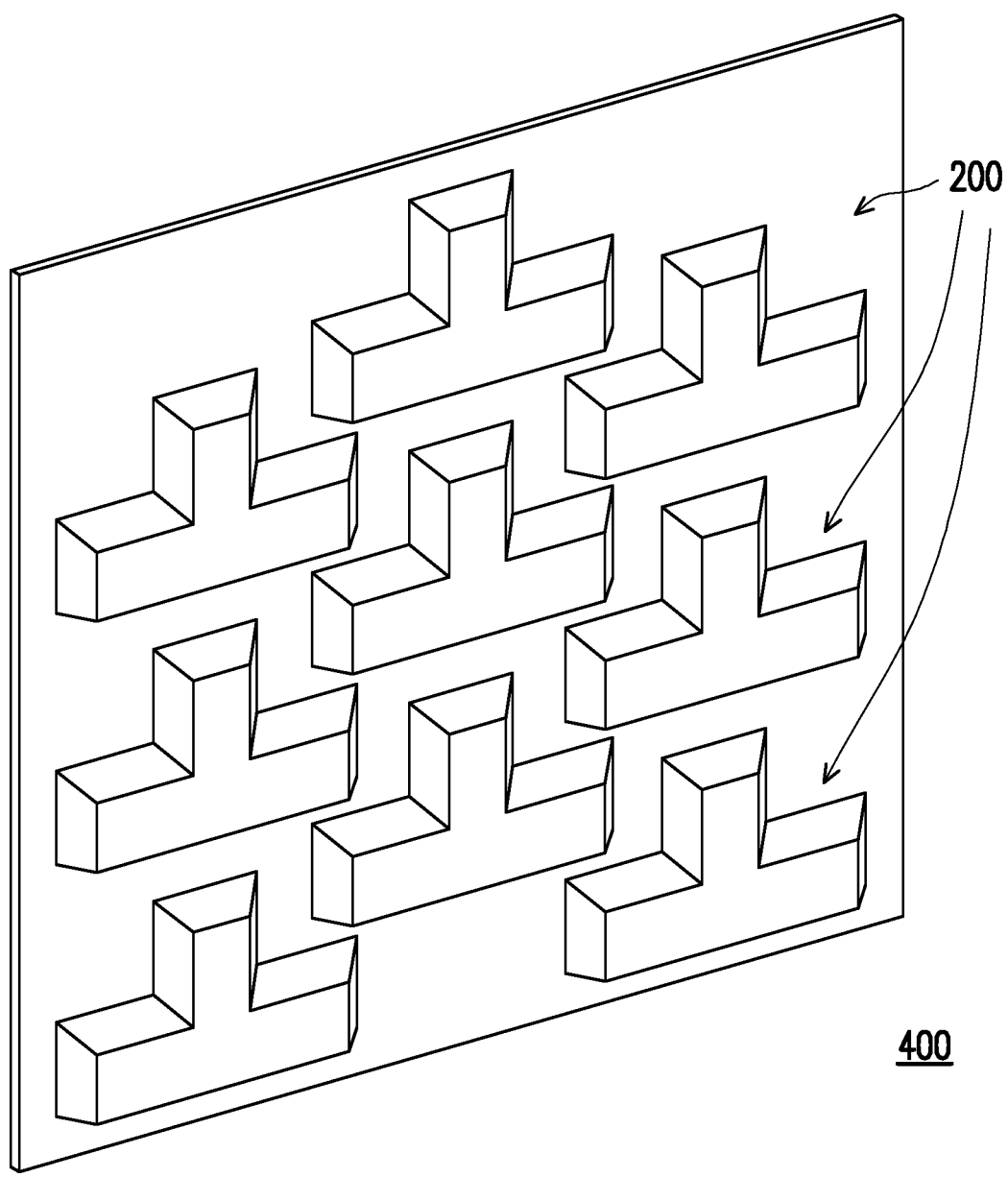

FIG. 5A to FIG. 5C are structural schematic diagrams of another light source module according to an embodiment of the invention. The light source module 400 of FIG. 5A to FIG. 5C is similar to the light source module 300 of FIG. 1A, and differences there between are as follow. As shown in FIG. 5A to FIG. 5C, in the embodiment, the number of the at least one light emitting units 200 of the light source module 400 is plural, and the light emitting units 200 are arranged in interleaving to form an array. In detail, as shown FIG. 5C, the light emitting units 200 are arrange in a plurality of rows, and positions of the light emitting units 200 of two adjacent rows are alternately shifted to form an interleaving arrangement. In this way, the arrangement of the light emitting units 200 is completed in a relatively tight and economical manner in accordance with the contour of the light emitting unit 200. However, the invention is not limited thereto, and in other embodiments, the light emitting units 200 may be arranged in other manners.

Moreover, since the light source module 400 of FIG. 5A to FIG. 5C is similar to the light source module 300 of FIG. 1A, and may achieve the same function through configuration of the light incident portion 110 and the light guiding branches 121, 122 and 123 of the light guiding portion 120 of the optical lens 100; therefore, the light source module 400 may achieve similar effects and advantages with that of the aforementioned light source module 300, and detail thereof is not repeated.

In summary, the light source module of the invention is adapted to control an emitting axial direction and an emitting position of the emitted light through configuration of the light incident portion and the light guiding branches of the light guiding portion of the optical lens, so as to achieve a purpose of dispersing the emitted light. Moreover, the light source module may also control and adjust a light shape of the emitted light, such that the light provided by the LED may be guided and effectively distributed to external evenly, so as to eliminate the glare and achieve a good light distribution, which avails being applied to outdoor lighting equipment such as street lamps or the like.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An optical lens, having a top surface, a bottom surface and a plurality of side surfaces, wherein the top surface is opposite to the bottom surface, and the top surface is connected to the bottom surface through the side surfaces, comprising:
   a light incident portion, comprising:
      two rear optical surfaces;
      a first light incident surface; and
      two second light incident surfaces, wherein each of the two second light incident surfaces has a first side edge and a second side edge opposite to each other, the first light incident surface is connected to each of the second light incident surfaces through the first side edge of each of the second light incident surfaces, each of the rear optical surfaces is connected to each of the second light incident surfaces through the second side edge of each of the second light incident surfaces; and
   a light guiding portion, having a plurality of light guiding branches, and the light guiding branches extending along different extending directions, wherein each of the light guiding branches has a main light emitting surface, and the first light incident surface and the second light incident surfaces face the main light emitting surfaces of the light guiding branches, respectively,
   wherein the first light incident surface and the bottom surface have a first included angle there between, and the first included angle is between 90° and 160°, or each of the side surfaces and the bottom surface have a second included angle there between, and the second included angle is between 20° and 90°.

2. The optical lens as claimed in claim 1, wherein the top surface has a plurality of top surface branches, the bottom surface has a plurality of bottom surface branches, the bottom surface branches respectively correspond to the top surface branches, and surfaces of one of the light guiding branches are formed by the corresponding top surface branch and the bottom surface branch and part of the side surfaces.

3. The optical lens as claimed in claim 2, wherein contours of orthogonal projections of the top surface and the bottom surface on a reference plane are similar to each other, and an area of the contour of the orthogonal projection of the top surface on the reference plane is smaller than an area of the contour of the orthogonal projection of the bottom surface on the reference plane.

4. The optical lens as claimed in claim 2, wherein the top surface and the bottom surface respectively have a T-shape contour.

5. The optical lens as claimed in claim 2, wherein the side surface facing the first light incident surface or each of the second light incident surfaces is the main light emitting surface of each of the light guiding branches, and the main light emitting surface of each of the light guiding branches is a trapezoid.

6. The optical lens as claimed in claim 2, wherein the bottom surface is connected with the rear optical surfaces, the first light incident surface and the second light incident surfaces to form an accommodating space.

7. The optical lens as claimed in claim 2, wherein the rear optical surfaces are perpendicular to the bottom surface.

8. A light source module, comprising at least one light emitting unit, and each of the light emitting units comprising:
   the optical lens as claimed in claim 1; and
   a light emitting element, adapted to provide a light beam, wherein the light beam enters the optical lens through the first light incident surface and the second light incident surfaces of the optical lens, and the light beam leaves the optical lens through the main light emitting surfaces of the light guiding branches.

9. The light source module as claimed in claim 8, wherein the number of the at least one light emitting unit is plural, and the light emitting units are arranged in interleaving to form an array.

10. The light source module as claimed in claim 8, wherein the top surface has a plurality of top surface branches, the bottom surface has a plurality of bottom surface branches, the bottom surface branches respectively correspond to the top surface branches, and surfaces of one of the light guiding branches are formed by the corresponding top surface branch and the bottom surface branch and part of the side surfaces.

11. The light source module as claimed in claim 10, wherein contours of orthogonal projections of the top surface and the bottom surface on a reference plane are similar to each other, and an area of the contour of the orthogonal projection of the top surface on the reference plane is smaller than an area of the contour of the orthogonal projection of the bottom surface on the reference plane.

12. The light source module as claimed in claim 10, wherein the top surface and the bottom surface respectively have a T-shape contour.

13. The light source module as claimed in claim 10, wherein the side surface facing the first light incident surface or each of the second light incident surfaces is the main light emitting surface of each of the light guiding branches, and the main light emitting surface of each of the light guiding branches is a trapezoid.

14. The light source module as claimed in claim 10, wherein the bottom surface is connected with the rear optical surfaces, the first light incident surface and the second light incident surfaces to form an accommodating space.

15. The light source module as claimed in claim 10, wherein the rear optical surfaces are perpendicular to the bottom surface.

\* \* \* \* \*